United States Patent [19]

Bechert

[11] Patent Number: 4,753,401

[45] Date of Patent: Jun. 28, 1988

[54] SURFACE, EXHIBITING REDUCED FLOW RESISTANCE, OF A BODY OVER WHICH TURBULENT FLOW TAKES PLACE

[75] Inventor: Dietrich Bechert, Berlin, Fed. Rep. of Germany

[73] Assignee: Deutsche Forschungs- und Versuchsanstalt für Luft- und Raumfahrt e.v., Fed. Rep. of Germany

[21] Appl. No.: 793,556

[22] Filed: Oct. 31, 1985

[30] Foreign Application Priority Data

Nov. 14, 1984 [DE] Fed. Rep. of Germany ....... 3441554

[51] Int. Cl.$^4$ ......................... B64C 21/02; B64C 21/10
[52] U.S. Cl. ...................................... 244/130; 244/200; 244/207
[58] Field of Search ............... 244/130, 200, 207, 209, 244/208

[56] References Cited

U.S. PATENT DOCUMENTS 3,184,185  5/1965  Brocard ............................. 244/207
3,451,645  6/1969  Wolcott ............................. 244/207

OTHER PUBLICATIONS

"Grooves Tame Air Turbulence, Boost Aircraft Efficiency", *Research and Development*, Mar. 1984, pp. 74–75.

Browne, "Slippery Skins for Speedier Subs", *Discovery*, Apr. 1984, pp. 67–71.

Bechert et al., "On the Drag Reduction of the Shark Skin", AIAA 85-0546, Mar. 12–14, 1985.

"Grooves Reduce Aircraft Drag", NASA Tech Briefs, Summer 1980, vol. 5, No. 2.

Bone, "Muscular and Energetic Aspects of Fish Swimming" *Swimming and Flying in Nature*, vol. 2, pp. 494–528.

Nitschke, *MAX-Planck-Institut fur Stromungsforschung*, "Exp. Untersuchung der Turb Stromung . . . ", Apr. 1983.

*Primary Examiner*—Galen Barefoot
*Attorney, Agent, or Firm*—Thomas & Kennedy

[57] ABSTRACT

The surface of the body is provided with grooves (5), which extend in the flow direction and which are separated from one another by ribs (4) which are constructed to have sharp edges. The surface is composed of a multiplicity of individual elements (3), which have the ribs (4) and grooves (5) on their side facing the flow. The individual elements (3) are disposed relative to one another and/or constructed in such a manner that slits are formed on the side facing the flow between the ribs and grooves. The slits (9) are connected with one another by channels (6) disposed below the surface of the individual elements (3) which faces the flow.

9 Claims, 3 Drawing Sheets

SURFACE, EXHIBITING REDUCED FLOW RESISTANCE, OF A BODY OVER WHICH TURBULENT FLOW TAKES PLACE

FIELD OF THE INVENTION

The invention relates to a surface, exhibiting reduced flow resistance, of a body over which turbulent flow takes place, with grooves which extend in the direction of flow and which are separated from one another by ribs constructed to have sharp edges. Such a surface, which is not designed to be smooth, is understood to refer to a surface profile constructed in three dimensions or to a surface structure.

BACKGROUND OF THE INVENTION

A surface of the initially described type is known from the AIAA Paper No. 83-0227, Bushnell, D. M. "Turbulent drag reduction for external flows". In this connection, fine longitudinal grooves extending in the direction of flow are provided, which are separated from one another by ribs having sharp edges and which reduce or even prevent transverse flow. The result of this is a surface which exhibits low resistance when turbulent flow takes place around the body.

From J. Fluid Mech. (1967), 30, pages 741–773, Kline, S. J., Reynolds, W. C., Schraub, F. A., Runstadler, P. W. "The sructure of turbulent boundary layers" it is known that the lowest layer, close to the wall, of a turbulent boundary layer, i.e, the viscous underlayer, exhibits in the direction of flow bands of reduced velocity, which can be designated as "slow bands". The "slow bands" are now and again swept up into a region of high velocity. This mechanism is an essential component of the turbulent exchange of pulses and generates the high flow resistance of a turbulent boundary layer.

If the "slow bands" are regarded as a secondary flow in the vicinity of the wall, which is caused by the alternating pressure distribution in the boundary layer, the measures for the reduction of the flow resistance should be aimed at obstructing or avoiding the formation of the "slow bands". The process by which the "slow bands" are produced is schematically illustrated in FIG. 1. A surface, over which turbulent flow takes place, of a body is represented; in this connection, the indicated velocity profiles may arise at a certain time. In a region of low pressure, slow fluid which flows along the surface of the body is aspirated and the result is a transverse flow, as a consequence of which the slow band is created. It is even possible that this slow band is swept upwardly, i.e. into a region of higher velocity, so that in this manner an exchange of pulses takes place, which has a particularly disadvantageous effect on the flow resistance. The velocity distribution at a "slow band" is moreover especially unstable, and this is a source of strong fluctuations which maintain the turbulence of the boundary layer. The transverse flow which leads to the formation of the "slow bands" can be obstructed by the known fine longitudinal grooves. The effect is the better, the more sharp-edged is the construction of the ridges of the ribs disposed between the grooves. In this manner, it is even possible to achieve a reduction in resistance which is of the order of magnitude of 8%.

SUMMARY OF THE INVENTION

The object of the invention is to reduce further the flow resistance of a surface of a body over which turbulent flow takes place and which has the initially mentioned features.

According to the invention, this is achieved in that the surface is composed of a multiplicity of individual elements which have the ribs and grooves on their side facing the flow, that the individual elements are disposed relative to one another and/or constructed in such a manner that slits are formed on the side facing the flow, and that the slits are connected with one another by channels which are disposed below the surface of the individual elements which faces the flow. The invention thus utilises in a skilful manner for the reduction of the flow resistance the same pressure difference as is unavoidably present in a turbulent flow and is the cause of the production of the "slow bands". In conjunction with the slits, this leads to a situation in which in regions of low pressure a discharge of fluid in the direction of flow takes place, and indeed precisely at those positions where a slow band would be formed. On the other hand, fluid is aspirated through the slits in regions of higher pressure. In order that the pressure difference should be able to act in the described manner, the slits are connected with one another by the channels.

The slits are preferably disposed transversely or obliquely to the direction of flow and are connected with the grooves. The grooves obstruct the transverse flow on the surface. The discharge of the fluid takes place as a result of the arrangement of the slits transversely or obliquely to the direction of flow. The region of the connections below the surface must be so large that an adequate pressure difference builds up, which is utilised for the discharge.

The channels are disposed substantially parallel to the direction of flow as well as transversely thereto, in order to permit the pressure compensation in all required directions.

The individual elements can be constructed to be rounded off at their front opposed to the direction of flow at the transition between the slits and the ribs or grooves, while the ribs end in the direction of flow at the slits in sharp edges. This results in a discharge in the direction of flow with low pressure losses.

The width of the grooves and of the slits is dimensioned to correspond to the thickness of the viscous underlayer of the boundary layer. These dimensions are normally very small. The dimension of the viscous underlayer varies hardly at all in the direction of flow in many cases, so that for these cases constant dimensions of the width of the grooves and of the width of the slits can be employed.

As regards the design of the channels for the pressure compensation below the surface, various possibilities offer themselves to a person skilled in the art. Bores, perforations, recesses or even notches disposed on the lowr side can be provided here.

It is also possible to connect the channels, in addition, to an aspirating or blowing pressure source, which can be operated at times or permanently. As a result of this forced discharge of aspiration through the slits, in addition to a further reduction in resistance, the creation of non-Laminar flow can be prevented for example at a wing of an aircraft.

it is also possible, when flow takes place around the body with water to the channels, to provide an arrangement for the introduction of polymer additives. Such polymer additives, which have a similar behaviour to fish mucus, leads to a reduction in the flow resistance in water. As a result of the introduction of the polymer additives through the slits of the surface into the fluid flowing round the body, the polymer additive is discharged precisely at those positions in the flow where it acts with a particularly stabilising effect. As a result of this, the consumption of polymer additives can also be reduced.

Finally, it is further possible in conjunction with the present invention to provide in the flow boundary layer one or more wings which are known per se for the alignment of the turbulence and which likewise contribute to the reduction of the flow resistance and to the alignment of the turbulence.

BRIEF DESCRIPTION OF THE DRAWINGS

The invention will be further described with reference to a preferred exemplary embodiment and with reference to the drawings. In the drawings.

DETAILED DESCRIPTION

Figure 1:
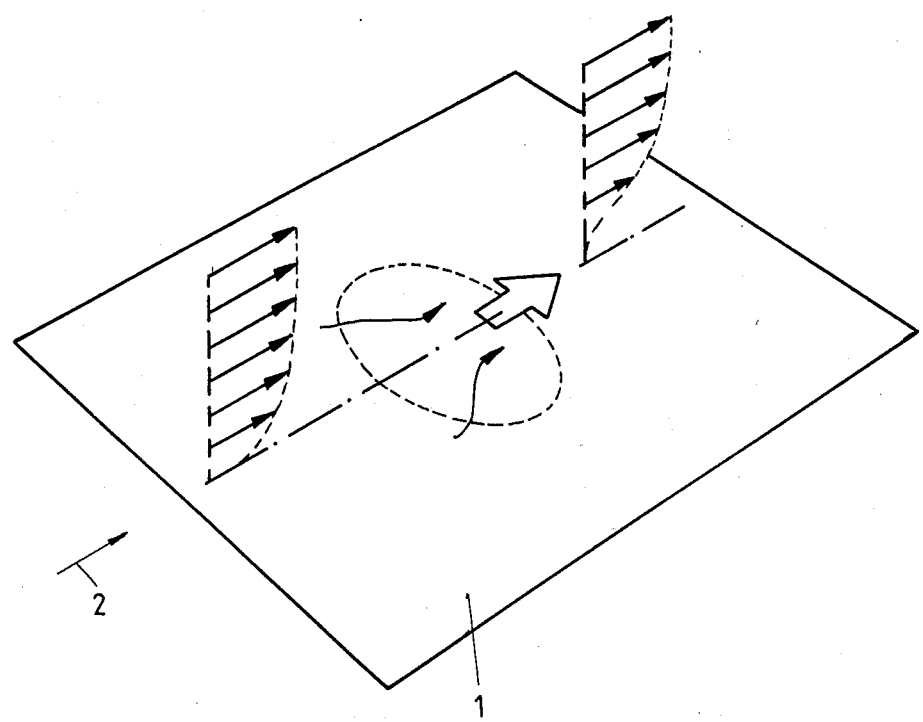
FIG. 1 shows a schematic representation indicating the creation of the "slow bands" at the surface of a body over which turbulent flow takes place.

FIG. 1 shows a portion of a smooth outer skin 1 of a body over which turbulent flow takes place in the direction of an arrow 2. In this connection, the velocity-profiles represented may arise. In a region of low pressure, a transverse flow takes place, i.e. a displacement of the flow direction transverse to the direction of the arrow 2, and the consequence of this is the creation of a slow band, which has an effect on the velocity profile. The smooth outer skin 1 can for example be the metallic skin of an aircraft.

Figure 2:
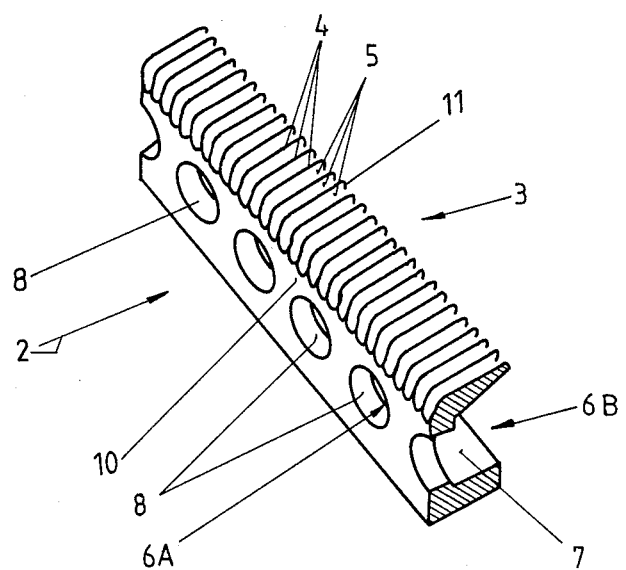
FIG. 2 shows a perspective representation of an individual element which in a multiplicity disposed with their surfaces side by side provides the new surface.

In order to reduce the flow resistance, the invention now provides a multiplicity of individual elements 3, one of which is represented in FIG. 2. Each individual element 3 exhibits on its surface facing the flow a multiplicity of ribs 4, which form between them grooves 5, which extend parallel to the flow direction according to arrow 2. Below the surface formed in this manner, each individual element possesses for example a recess 7 extending transversely as well as apertures 8 which are adjacent to one another. In association, mutually adjacent channels 6A are thus formed by several individual elements 3; the channels 6A extend in the flow direction according to arrow 2 as well as transversely threto and channels 6B extend transversely to channels 6A below the surface of the individual elements 3. These channels 6 serve for pressure compensation.

Figure 4:
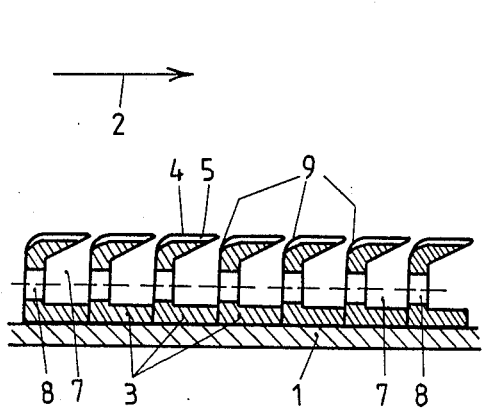
FIG. 4 shows a section according to the line IV—IV in FIG. 3.
Figure 3:
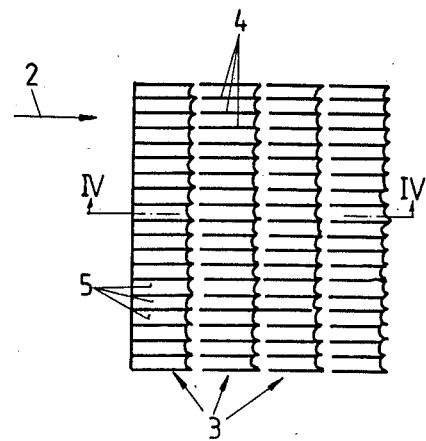
FIG. 3 shows a plan view of such a surface.

A multiplicity of the elements represented in FIG. 2 are for example affixed, as is shown in FIGS. 3 and 4 on the smooth outer skin 1, in such a manner that in the surface of the individual elements a multiplicity of slits 9 are formed, through which fluid can enter the channels 6 from the flow or can pass out from the channels 6 into the flow. If a region of low pressure is involved, fluid will pass out into the flow. If a region of high pressure is involved, fluid will enter the channels 6 from the flow. The pressure compensation takes place below the surface of the individual elements which faces the flow. The slits 9 are disposed in such a manner that they are connected with ribs 4 and the grooves 5. The individual elements possess rounded off portions 10 on their side facing the flow, at the ribs 4, while more especially at their rear ends sharp-edged places 11 are provided. Otherwise, the ribs 4 are likewise constructed to be sharp-edged over their extent in the flow direction 2.

Figure 5:
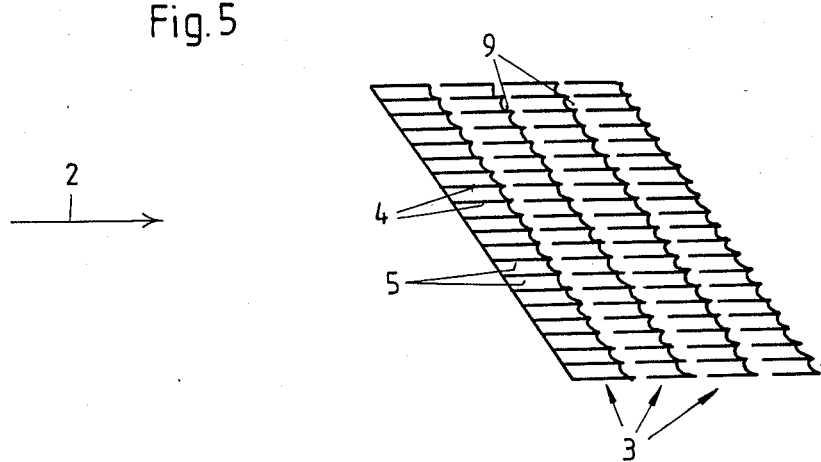
FIG. 5 shows a plan view of the surface similar to FIG. 3, but in oblique disposition
Figure 6:
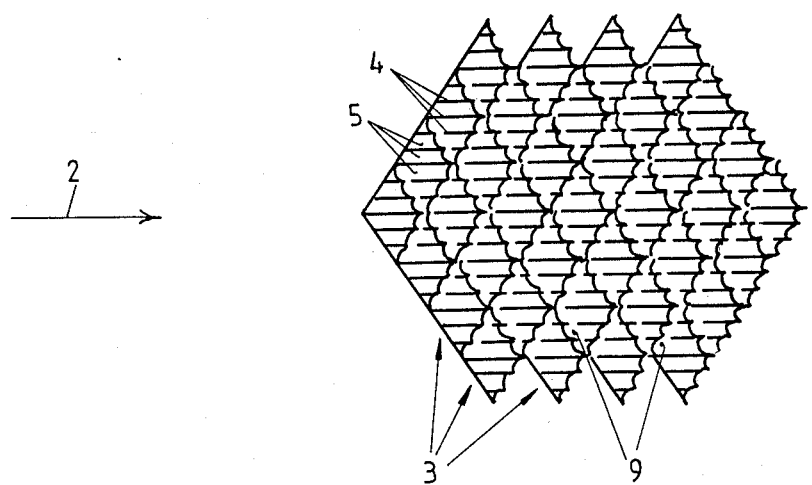
FIG. 6 shows a plan view of the surface similar to FIG. 3, but in crossing disposition.

The individual elements 3 do not necessarily need to be oriented transversely, i.e. at 90°, to the direction of the flow according to arrow 2. Oblique arrangements according to FIGS. 5 and 6 are also possible. In these circumstances, the individual elements 3 which are employed in this connection are designed in an appropriate manner.

The production of the surface could also take place in such a manner that milled plastic material profiles similar to the individual elements according to FIG. 2 are welded onto a plastic material web. The apertures 8 of the channels 6 may also be replaced by notches on the lower side of the individual elements. Such plastic material webs may also readily be exchanged in the event of damage.

12=velocity profile
13=wing airfoil
14=wing stabilizer
List of reference numerals:
1=Smooth outer skin
2=Arrow
3=Individual element
4=Ribs
5=Grooves
6=Channels
7=Recess
8=Aperturs
9=Slits
10=Rounded off portions
11=Sharp-edged places

What is claimed is:

1. Surface, exhibiting reduced flow resistance, of a body over which turbulent flow takes place, with grooves which extend in the direction of flow and which are separated from one another by ribs which are constructed so as to have sharp edges, characterised in that the surface is composed of a multiplicity of individual elements (3) which have the ribs (4) and grooves (5) on their side facing the flow, that the individual elements (3) are disposed relative to one another and/or constructed in such a manner that slits (9) are formed on the side facing the flow, and that the slits (9) are connected with one another by channels (6A) which are disposed below the surface of the individual elements (3) which faces the flow.

2. Surface according to claim 1, characterised in that the slits (9) are disposed transversely or obliquely to the direction of flow and are connected with the grooves (5).

3. Surface according to claim 1 characterized in that the channels (6A/6B) are disposed parallel to the direction of flow as well as transversely thereto whereby fluid communication is provided between all of the grooves of all of the individual elements.

4. Surface according to claim 1, characterised in that the individual elements (3) are constructed to be rounded off at their front opposed to the direction of flow at the transition between the slits (9) and the ribs (4) or grooves (5), and the ribs (4) end in the direction of flow at the slits (9) in sharp edges.

5. Surface according to claim 1, characterised in that the width of the grooves (5) and that of the slits (9) are dimensioned to correspond to the thickness of the viscous underlayer.

6. Surface according to claim 1, characterised in that the channels (6A) are formed by notches disposed on the lower side of the individual elements (3).

7. Surface according to Claim 1, characterised in that an aspirating or blowing pressure source is connected to the channels (6A).

8. Surface according to claim 1, characterised in that when there is circulation about the surface with water to the channels an arrangement for the introduction of polymer additives is provided.

9. A fluid flow surface structure over which turbulent flow takes place comprising a plurality of fluid flow elements of substantially similar size and shape mounted on a surface in juxtaposition with one another to form a substantially uniform fluid flow surface, each of said fluid flow elements including a series of longitudinal ribs usually aligned with the direction of fluid flow and facing the fluid flow, grooves formed between said ribs, the ribs and grooves of each fluid flow element being spaced from the ribs and grooves of adjacent fluid flow elements in the direction of fluid flow and forming slits therebetween said slits extending transversely to the direction of fluid flow, fluid flow channels formed in each fluid flow element and in communication with fluid flow channels of adjacent fluid flow elements and forming a network of fluid flow channels, said fluid flow channels being in communication with the slits formed between adjacent ones of said fluid flow elements, whereby there is free fluid communication through the network of channels and the slits.

* * * * *